(12) United States Patent
Kramer et al.

(10) Patent No.: US 8,344,314 B2
(45) Date of Patent: Jan. 1, 2013

(54) PRESSURE SENSOR

(75) Inventors: Axel Kramer, Wettingen (CH); Frank Kassubek, Rheinfelden (DE); Klaus Bohnert, Oberrohrdorf (CH); Hubert Braendle, Oberengstringen (CH)

(73) Assignee: ABB Research Ltd, Zurich (CH)

( * ) Notice: Subject to any disclaimer, the term of this patent is extended or adjusted under 35 U.S.C. 154(b) by 220 days.

(21) Appl. No.: 12/685,372

(22) Filed: Jan. 11, 2010

(65) Prior Publication Data
US 2010/0108870 A1    May 6, 2010

Related U.S. Application Data

(63) Continuation of application No. PCT/EP2007/057193, filed on Jul. 12, 2007.

(51) Int. Cl.
  *G01L 7/00* (2006.01)
  *G01L 11/02* (2006.01)
  *G01L 1/24* (2006.01)
(52) U.S. Cl. .................. 250/231.19; 250/227.14; 73/705
(58) Field of Classification Search ............. 250/231.19, 250/227.14, 227.11; 73/700, 705, 715, 716
  See application file for complete search history.

(56) References Cited

U.S. PATENT DOCUMENTS

| | | | |
|---|---|---|---|
| 3,122,922 A | | 3/1964 | Kramer et al. |
| 4,451,730 A * | | 5/1984 | Brogardh et al. ........ 250/227.23 |
| 4,518,857 A | | 5/1985 | McMahon et al. |
| 4,628,740 A * | | 12/1986 | Ueda et al. ....................... 73/705 |
| 4,778,987 A * | | 10/1988 | Saaski et al. .................. 250/226 |
| 4,784,811 A * | | 11/1988 | Hirschfeld ................... 264/1.27 |
| 5,009,107 A * | | 4/1991 | Grasdepot ....................... 73/705 |
| 5,022,045 A * | | 6/1991 | Elliott .............................. 374/20 |
| 5,128,535 A * | | 7/1992 | Bock et al. ............... 250/227.21 |
| 5,289,720 A * | | 3/1994 | Gualtieri et al. ................. 73/705 |
| 5,475,489 A * | | 12/1995 | Gottsche ........................ 356/364 |
| 5,515,459 A * | | 5/1996 | Farhadiroushan .............. 385/12 |
| 5,561,522 A * | | 10/1996 | Rapoport et al. ............. 356/477 |
| 5,912,457 A | | 6/1999 | McQuaid |
| 6,208,776 B1 * | | 3/2001 | Prohaska et al. ................ 385/13 |
| 6,597,821 B1 * | | 7/2003 | Bohnert et al. .................. 385/12 |
| 6,856,399 B2 * | | 2/2005 | Kuskovsky et al. .......... 356/457 |
| 6,991,687 B2 * | | 1/2006 | Poor et al. ...................... 148/235 |
| 7,187,453 B2 * | | 3/2007 | Belleville ....................... 356/504 |
| 7,305,888 B2 * | | 12/2007 | Walchli et al. ................... 73/714 |

(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/EP2007/057193 dated Jan. 21, 2010.

(Continued)

*Primary Examiner* — John Lee
(74) *Attorney, Agent, or Firm* — Buchanan Ingersoll & Rooney PC (57) ABSTRACT

A pressure sensor is disclosed with at least one pressure sensing element, the pressure induced changes in the optical properties of which are evaluated by illumination with at least one light source. The pressure sensor can include at least two semiconductor-based pressure sensing elements located in individual pressure chambers, which sensing elements are located essentially adjacent to each other. The sensing elements can be irradiated with the same light source, wherein the light transmitted through the sensing elements is detected using at least two corresponding detectors, and wherein the differential pressure in the two pressure chambers is evaluated based on the output of these detectors.

30 Claims, 5 Drawing Sheets

U.S. PATENT DOCUMENTS

| | | | |
|---|---|---|---|
| 7,409,863 B2* | 8/2008 | Bateman et al. | 73/705 |
| 7,526,148 B2* | 4/2009 | Kilic et al. | 385/12 |
| 7,703,331 B2* | 4/2010 | Magne et al. | 73/800 |
| 7,707,891 B2* | 5/2010 | Antila et al. | 73/714 |
| 7,832,276 B2* | 11/2010 | Wu et al. | 73/705 |
| 7,836,773 B2* | 11/2010 | Sakamoto et al. | 73/705 |
| RE42,834 E* | 10/2011 | Watson | 604/319 |
| 2002/0110180 A1* | 8/2002 | Barney et al. | 374/161 |
| 2005/0094954 A1* | 5/2005 | Pickrell et al. | 385/123 |
| 2005/0230624 A1* | 10/2005 | Schubert | 250/339.13 |
| 2006/0060862 A1* | 3/2006 | Bawendi et al. | 257/76 |
| 2007/0223000 A1* | 9/2007 | Gahan et al. | 356/454 |
| 2009/0199647 A1* | 8/2009 | Hadjiloucas et al. | 73/716 |
| 2010/0108870 A1* | 5/2010 | Kramer et al. | 250/231.19 |
| 2010/0180686 A1* | 7/2010 | Kramer et al. | 73/705 |
| 2010/0281991 A1* | 11/2010 | Seeberg | 73/716 |

OTHER PUBLICATIONS

International Search Report of Application No. PCT/EP2007/057193 dated May 8, 2008.

Written Opinion of the International Searching Authority of Application No. PCT/EP2007/057193 dated May 8, 2008.

W. Trzeciakowski et al., "Optical Pressure Sensors Based on Semiconductor Quantum Wells", Sensors and Actuators—A Physical, vol. A32, No. 1/3, pp. 632-638, XP-000287383, Apr. 1992.

\* cited by examiner

PRESSURE SENSOR

RELATED APPLICATION

This application claims priority as a continuation application under 35 U.S.C. §120 to PCT/EP2007/057193 filed as an International Application on Jul. 12, 2007 designating the U.S., the entire content of which is hereby incorporated by reference in its entirety.

FIELD

The present disclosure pertains to the field of pressure sensing elements which are based on pressure sensor units wherein, for example, the pressure induced changes in the optical properties of which are read out by illumination with a light source.

BACKGROUND INFORMATION

From patent literature and from other technical publications it is known to utilize photoluminescence or absorption characteristics in semiconductor materials for measurement of parameters, such as temperature and pressure.

It has been proposed to use the shift of the absorption edge of bulk GaAs for pressure sensing. However this can result in severe difficulties, such as thermal stabilization and temperature cross-talk effects. After compensation the remaining temperature error, for example, can be 1.5 bar/K, whereas without compensation it could be 40 bar/K.

Others have demonstrated that the luminescence spectra and absorption of e.g. GaAs/Al(x)Ga(1-x)As, InGaAs/GaAs systems can be useful for pressure calibration. It has been purported to use the shift of laser lines of AlGaAs and InGaAs/GaAs quantum-well laser structures, such as for the high pressure regime (several GPa). For the latter, problems can be related to mode hopping and hysteresis. Apart from using the band gap shift for optical pressure sensing it can also be used for tuning the laser wavelength of semiconductor laser diodes. Tuning ranges larger than 200 nm have, for example, been reported

SUMMARY

A pressure sensor is disclosed, comprising: at least two pressure sensing elements positioned in individual pressure chambers, which pressure sensing elements are arranged at least close to each other for irradiation by a common light source such that light transmitted through the pressure sensing elements will depend on pressure; and at least two detectors, wherein differential pressure in the two pressure chambers is evaluated based on outputs of the two detectors.

A method is also disclosed for detecting a pressure using a pressure sensor, comprising: arranging at least two semiconductor-based or photonic-crystal-based pressure sensing elements in individual pressure chambers for irradiation by one light source; illuminating the at least two pressure sensor elements with the one light source; detecting light transmitted through the pressure sensing elements using at least two detectors; and evaluating pressure induced changes in optical properties of the pressure sensing elements using a differential pressure in the two pressure chambers based on at least one of a differential output of the detectors, a sum output of the detectors, and a ratio of outputs of the detectors.

BRIEF DESCRIPTION OF THE DRAWINGS

In the accompanying drawings exemplary embodiments and/or documentary evidence in support of the disclosure are shown in which.

DETAILED DESCRIPTION

A pressure sensor assembly is disclosed in which, for example, at least some of the deficiencies of known assemblies can be reduced, if not eliminated. An exemplary pressure sensor is disclosed with at least one semiconductor-based pressure sensing element, pressure induced changes in optical properties of the sensing element being read out by illumination with at least one light source. A differential pressure sensor can be realized with, for example, high accuracy and low errors caused by temperature effects.

An exemplary pressure sensor as disclosed herein includes at least two semiconductor-based pressure sensing elements located in individual pressure chambers, which sensing elements can be located essentially adjacent to each other and which sensing elements can be irradiated with a light source, such as a common (i.e., the same) light source, wherein light transmitted through the sensing elements can be detected using at least two corresponding detectors, and wherein the differential pressure in the two pressure chambers can be evaluated based on the output of these detectors.

In an exemplary differential pressure sensor based on semiconductor optical filters as disclosed herein, pressure applied to semiconductor materials changes their optical properties, such as a spectral absorption edge frequency. Semiconductors can be used as optical filters and, for example, to exploit the blue-shift of their absorption edge when exposed to hydrostatic pressure. The pressure-induced spectral shift of the filter edge can be monitored by detecting the total transmitted light power from a light source. In order to address (e.g., avoid) temperature effects, two pressure chambers can be located close to each other to avoid temperature differences between the two pressure chambers and evaluate the difference signal of the transmissions through two filters. Two pressure chambers can be used for measuring the differential pressure. Additionally, a temperature compensation can be achieved by, for example, use of an additionally split four quadrant sensor. A difference signal of the transmitted light of a single light source can be evaluated to, for example, enable a linear sensor response and the compensation of zero-point errors that result from static pressure and/or temperature.

Exemplary embodiments can exploit the intrinsic lattice deformation of semiconductors upon pressure, leading to a change of its band gap energy and consequently of the optical properties. Higher pressure can lead to an increase of the optical output frequency of an emitter or, in case of a passive device such as a filter, can lead to the blue-shift of its absorption edge.

Exemplary embodiments as disclosed herein can use semiconductors as optical filters and exploit the blue-shift of their absorption edge when exposed to hydrostatic pressure. This spectral shift can be measured in transmission using a light source. An exemplary embodiment of this disclosure can be described as follows: The light in the system is described by two identical light beams that are emitted from a light-emitting diode. The light beams are transmitted through two filters that are placed in different pressure chambers. The light beam amplitudes or powers are detected in the subsequent detector diodes. The difference between the intensities is measured in the two detectors and evaluated by appropriate electronics. As filters, a material composed of semiconductor nanocrystals embedded in a glass matrix can be used. An exemplary advantage of such a system is that it can offer a high degree of freedom for tailoring the desired edge position and that it can be inexpensive and commercially available (e.g. SCHOTT, optical filters). The filters can also be made of, or include, bulk semiconductor crystals, such as GaAs. An exemplary advantage of GaAs compared to SCHOTT glass is a three times higher pressure coefficient. The sensor can be used for measuring large pressures under rough environmental conditions.

As mentioned, exemplary embodiments can include two pressure chambers for measuring the differential pressure applied to both chambers. The difference signal of the transmitted light of a single light source can be evaluated to, for example, enable a quasi-linear sensor response and the compensation of zero-point errors which can arise from static pressure and/or temperature. Two different semiconductors can be used to, for example, allow an even better error compensation.

According to a first exemplary embodiment of the present disclosure, the two pressure sensing elements can be arranged close to each other or even edge to edge either in one plane or under an angle of smaller than 180°, which angle can be adapted to the light emission characteristics of the light source, and for example under an angle of more than or equal to 90°, wherein the light source is arranged on one side of the pressure sensing elements and irradiates the pressure sensing elements under comparable (e.g., symmetrical and/or identical) optical conditions. For example, irradiation can occur in an essentially identically/symmetrical manner, under comparable or symmetrical or identical light insensity and light intensity distribution, using for example comparable or symmetrical or identical incidence angles, focusing, and so forth. The light source can, for example, irradiate the pressure sensing elements under essentially normal incidence.

A close proximity of the pressure sensing elements can essentially reduce temperature gradients and resulting errors in the differential signal. To achieve an optimal irradiation by the single light source in an exemplary embodiment, the two pressure sensing elements can either be arranged in one single plane, the single light source being positioned above the two pressure sensing elements essentially in the plane orthogonal to the plane of the two pressure sensing elements, or the two pressure sensing elements can be tilted with their outer edges towards the light source, so that irradiation falling onto the pressure sensing elements is as orthogonal as possible, the orthogonal light incidence being limited by the divergence of the light beam(s) of the light source. In this latter case the two pressure sensing elements so to speak can enclose the light source partially.

In this respect, a high degree of similarity or, for example, identity of the irradiation of the two sensors is possible if the pressure sensor includes, for example, a symmetry plane (mirror plane), the light source being positioned essentially in this symmetry plane and the pressure sensing elements being positioned in corresponding half spaces defined or separated by said symmetry plane. This symmetry plane in case of rectangular pressure sensing elements can include the line at which essentially the sensing elements or the pressure chambers are adjacent to each other. For example, the pressure sensing elements can be positioned in either of the half spaces in mutually symmetrical positions.

For a high possible stability of the relative orientation of the light source and the sensors, and in order to avoid errors induced by relative misalignments or positional shifts, an optically transparent element can be provided in an exemplary embodiment between the light source and the sensor elements, and the light source and/or the sensor elements can be attached onto or integrated in this transparent element. Therefore, according to a further exemplary embodiment, an optically essentially transparent block, such as a glass block, can be provided between the pressure sensing elements and the light source, through which glass block the illumination passes from the light source to the pressure sensing elements, wherein the light source can be fastened onto or integrated in the block, and wherein the pressure sensing elements and/or the pressure chambers can be fastened onto or integrated in the block.

According to a further exemplary embodiment, each pressure chamber can include at least one frame element holding at least two optically essentially transparent, distanced (e.g., parallel) windows, one of them facing the light source and the other one facing the detector, wherein an inter-space between the two windows forms a cavity of the pressure chamber in which the semiconductor-based pressure sensing elements are located. For example, the cavity can be filled with oil, e.g. silicone oil can be used. The windows can for example be sapphire windows, and the two pressure chambers can be arranged in the same plane.

As mentioned, the pressure sensing elements can be filter elements with an absorption edge which is shifted under the influence of external pressure. The filter elements can, for example, be provided as a glass matrix, such as a borosilicate glass matrix, having semiconductor nano-crystals embedded therein, or as a bulk semiconductor crystal, or are based on a photonic crystal.

In order to further avoid errors, such as errors due to temperature differences and the like, an intensity detector can be used for the measurement of the intensity of the light source without attenuation through any of the pressure sensing elements, and/or a temperature sensing detector can be provided, and an output of one or both of these detectors can be taken into account for compensation of induced spectral shifts that are disturbing the pressure measurement or the differential pressure measurement.

A further exemplary setup can include at least two pairs of pressure sensing elements irradiated by the same light source, each pair comprising (e.g., consisting of) the same type of pressure sensing elements. In this case, the two pairs of pressure sensing elements can, for example, have different filter absorption edges. For example, two sensing elements of different absorption edge and hence different (differential) pressure sensitivity can be provided in the same pressure chamber in this configuration.

The evaluation of the transmittance can actually measure the full spectrum in detail. In an exemplary embodiment, detectors can be provided which are measuring the total integrated intensity within a certain spectral range (normally the detection window of the detector). The detectors can be detector diodes which can electronically be connected such that the combined output of the two detector diodes is their difference signal.

As mentioned, the light source can be a broadband light source, meaning that its spectral width is on the order of or smaller than the spectral width of the filter absorption edge. The light source can, for example, be a light emitting diode.

A method is also disclosed for detecting a pressure using a pressure sensor with at least one semiconductor-based pressure sensing element, the pressure induced changes in the optical properties of which can be evaluated/read out by illumination with at least one light source. At least two semiconductor-based pressure sensing elements can be arranged in individual pressure chambers and essentially adjacent to each other, which sensing elements can be irradiated by the same light source, wherein the light transmitted through the sensing elements is detected using at least two corresponding detectors. A differential pressure in the two pressure chambers can be evaluated based on the differential output of these detectors, based on the sum output of these detectors, based on the ratio of the outputs of these detectors, and/or based on any combination of any of these.

A pressure sensor as disclosed herein can be used for the measurement of pressure differences above 500 bar, such as above 800 bar up to 20000 bar or lesser or greater. In this exemplary range of pressure differences, very high sensitivity and independence of temperature influences can, for example, be achieved.

Sensor Concept:

Physical principle: An exemplary sensor is based on a change of optical properties of semiconductor or photonic crystal material upon application of pressure. Hydrostatic pressure leads to lattice deformations and thus to changes of the electron band structure (or photonic band gap structure) of the material. Electronic and optical properties, such as energy band gap, absorption, luminescence and so forth are altered. Semiconductors used as optical filters exhibit a blue-shift of their absorption edge when exposed to hydrostatic pressure. Wavelength shifts can be in the exemplary range of 0.0025 nm/bar.

Figure 1:
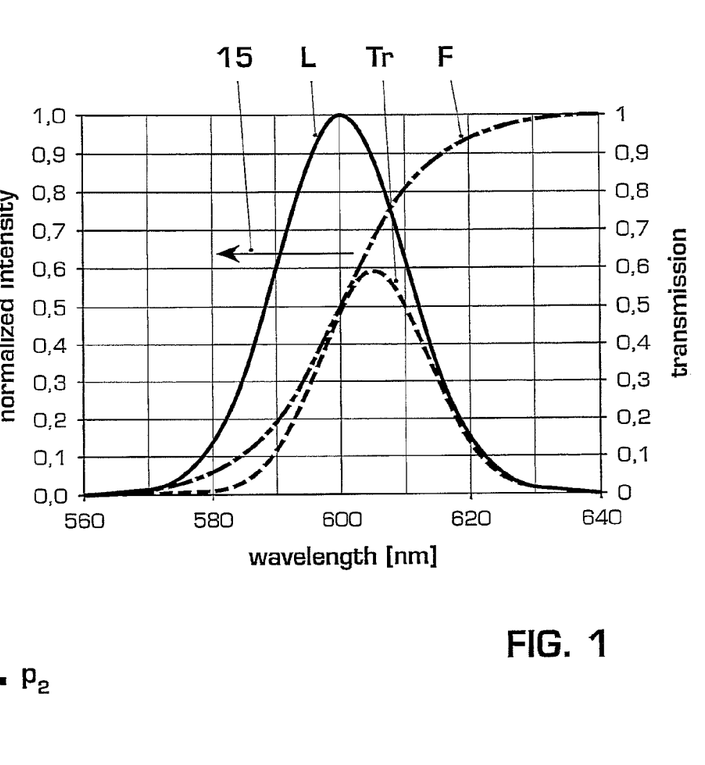
FIG. 1 shows spectral characteristics of an exemplary light source (L) and filter (F), wherein filter characteristics (F) are given by an axis on the right, an LED spectrum (L) is given on an axis on the left, a sensor measuring an integral of a spectral curve of transmission (Tr)

This spectral shift can be measured using the transmission of a broadband (or monochromatic) light source, like a light-emitting diode (LED) or laser, through the filter. Peak wavelength and spectral width of the LED should fit to the position and width of the absorption edge of the filter. FIG. 1 shows the spectral characteristics of an exemplary configuration and a calculated transmission curve. In this Fig. the spectral characteristics of light source L and filter F are given. The filter characteristics are scaled according to the axis on the right, the LED spectrum is scaled according to the axis on the left. Also given is the LED light transmission Tr through the filter; a sensor measures the integral of this spectral curve. Pressure shifts the filter curve F to lower wavelengths (arrow 15), thus altering the spectral transmission.

Figure 2:
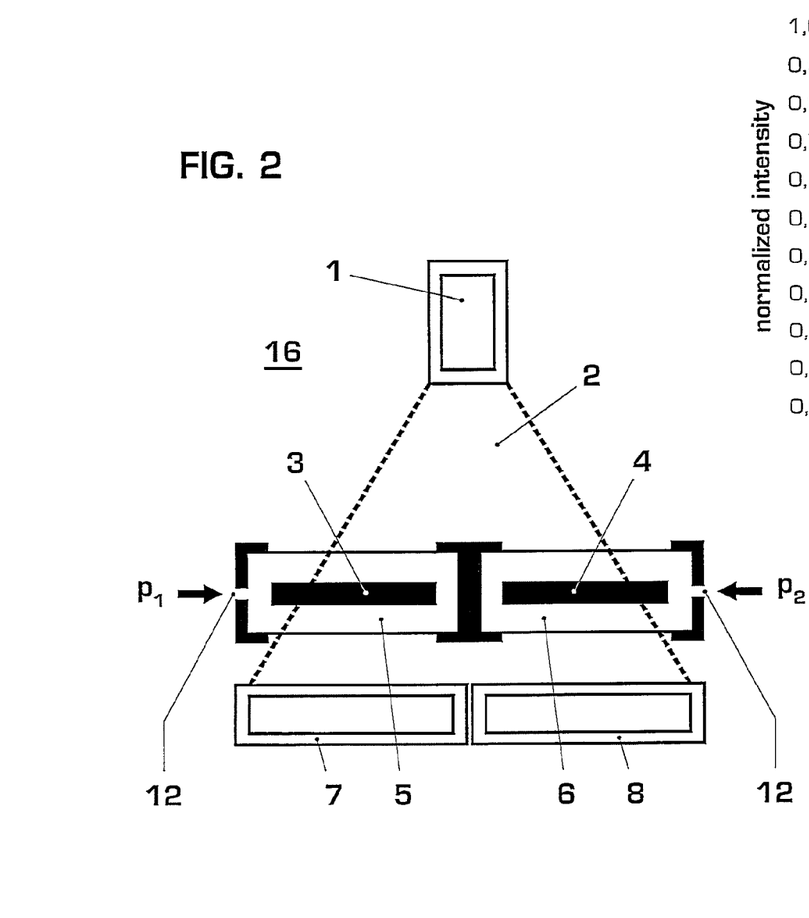
FIG. 2 shows an exemplary setup of a semiconductor differential pressure sensor according to an embodiment of the disclosure.

An exemplary scheme of a pressure sensor 16 based on this principle is sketched in FIG. 2. The sensing element 3, 4 is a standard color glass filter comprising (e.g., consisting of) dispersed semiconductor nanocrystals embedded in a borosilicate glass matrix. These sensing elements are located in individual pressure chambers 5, 6 which are located close to each other in the same plane and which are irradiated by the same light beam 2. The pressure-induced spectral shift of the filter edge can be monitored by detecting the total transmitted light power emitted from an LED 1. This intensity measurement can be realized at relatively low-cost using the detectors 7, 8; a spectral evaluation of the light intensity can also be performed.

Temperature changes can lead to a similar shift of the band gap in the semiconductor (opposite sign, approximately 0.15 nm/K, see Table 1 below). The elimination of temperature influences can be decisive for the performance of the sensor. In order to avoid changes of the zero-point pressure signal caused by temperature variations, two pressure chambers 5, 6 can be used and a difference signal of the transmissions through two filters 3, 4 (see FIG. 2) can be evaluated.

Sensor model and signal: In order to evaluate the performance of an exemplary sensor built according to the principles described above, a simplified model of the physical sensor for the estimate of the sensor signal and its sensitivity to perturbations and so forth was used. The specifications of this exemplary sensor are given below. The performance of a sensor 16 allows to estimations of the order of magnitude of the measurement and perturbation effects with good precision.

The light 2 in the system is described in the model by two identical light beams that are emitted from the LED 1. The beams are transmitted through the two filters 3, 4 that are exposed to the pressures p1 and p2, respectively. The beam amplitudes or powers or intensities $I_1$, $I_2$, respectively, are detected in the subsequent detector diodes 7, 8. In order to arrive at a simple mathematical model for the sensor, the LED spectrum can be approximated to be Gaussian and the filter absorption characteristic by an error function. These approximations give very good fits to the data of real LEDs and filters. Changes of temperature and pressure can lead to a linear shift of the edge frequency of the filters; temperature can also linearly shift the peak frequency of the LED. Changes in the width of the filter characteristic and LED peak can, for example, be neglected. It is assumed that temperatures of filter and LED are identical.

These approximations can be used to arrive at analytical equations for the sensitivity of the system with respect to differential pressure. The difference between the intensities measured in the two detector parts 7, 8 ($I_1$ and $I_2$, respectively) is used as a basic signal. The signal $I_1-I_2$ has the following properties in summary:

(i) $I_1-I_2$ vanishes for zero differential pressure $\Delta p$ independent of static pressure and temperature of the sensor: $I_1-I_2=0$ for $\Delta p=0$, $\Delta p$ being defined as p1-p2. The difference measurement allows elimination of zero-point errors induced by absolute pressure variations. The exemplary setup according to disclosure can be superior because otherwise compensation of zero-point errors or variations can be very difficult to achieve.

(ii) The signal $I_1-I_2$ is monotonous in the differential pressure $\Delta p$, which is desirable for a measurement signal.

(iii) The dependence of $I_1-I_2$ on differential pressure $\Delta p$ is essentially linear: $I_1-I_2 \sim S(\Sigma_p, T)\Delta p$, wherein S designates the sensitivity of the sensor with respect to differential pressure, $\Sigma p$ the static pressure and T the sensor temperature. The static pressure equals $\Sigma_p=(p1+p2)/2$. For the exemplary system described here and investigated below, deviations from linearity are below 0.3%. For a monotonous and non-ambiguous function, nonlinearities can be compensated; however, for an almost linear function compensation is simpler and less complex. Note that the differential pressure sensitivity depends on the static pressure $\Sigma_p$ and the temperature T; these dependences are, for example, corrected.

Under these assumptions the sensitivity S of the sensor to differential pressure $\Delta p$ can be calculated. By taking into account light amplitudes, detector efficiency (based on available device data) and desired pressure resolution, pressure ranges of the system and errors can be determined.

System Evaluation

Figure 3A:
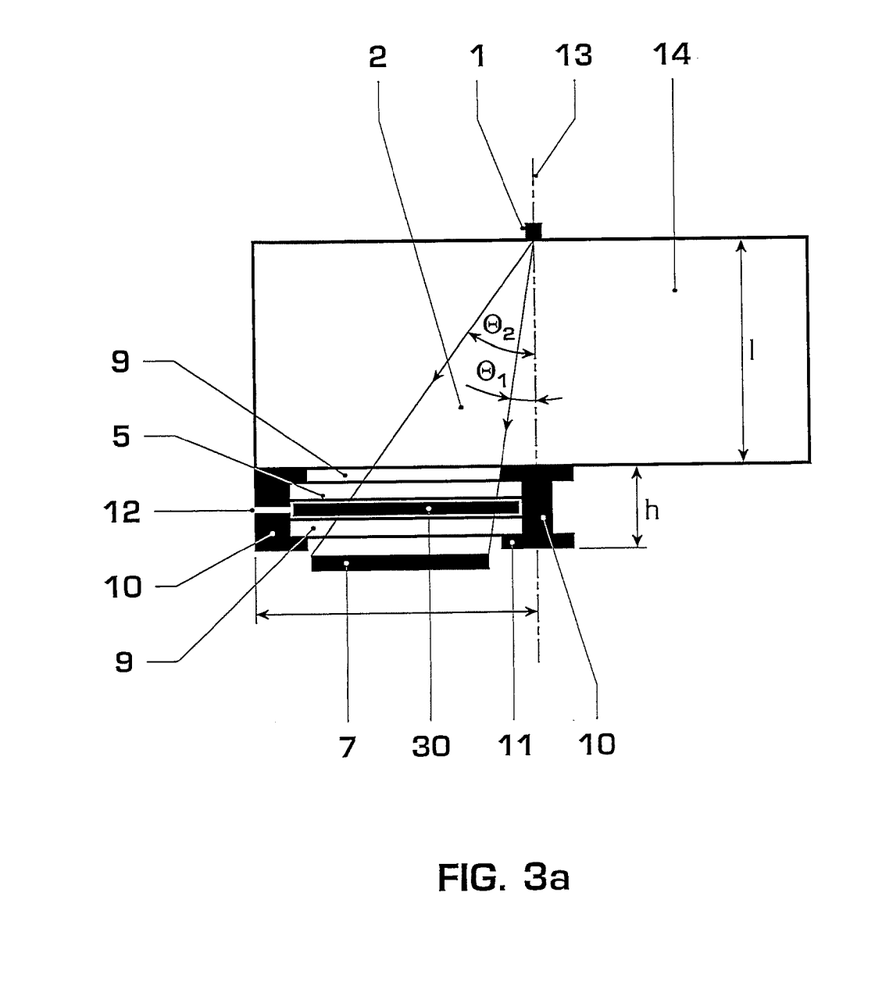
FIG. 3 shows an exemplary setup of a semiconductor differential pressure sensor according to an embodiment of the disclosure with approximate dimensions in side view (a) and top view (b), wherein because of symmetry only a left half of the pressure chambers is shown.
Figure 3B:
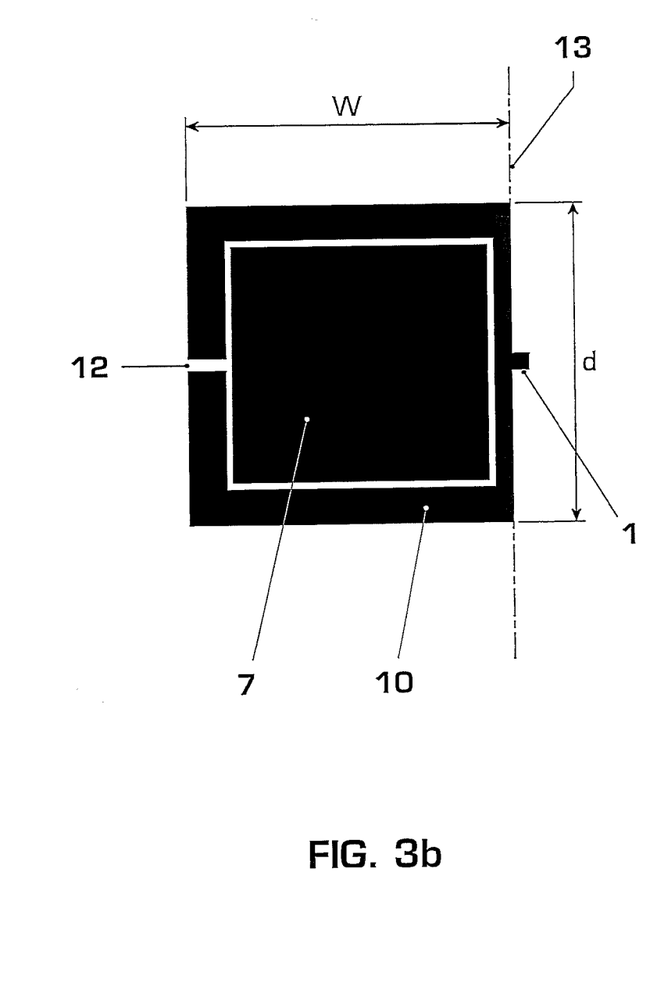

System specification: An exemplary sensor configuration under investigation is shown in FIG. 3. As the filter glasses 3, 4 (but not the LED 1) are positioned inside the respective pressure chamber 5, 6, no electrical connections have to be fed into the pressurised area.

Two pressure chambers 5, 6 are used for the measurement of differential pressure. However, even for a possible absolute pressure sensor, a structure similar to FIG. 3 can be used. FIG. 3 gives an exemplary sensor setup with approximate dimensions, wherein w is chosen to be approximately 15 mm, d is chosen to be approximately 17 mm, l is chosen to be approximately 14 mm and h is chosen to be approximately 5 mm.

A single LED 1 can be used to illuminate the system. This can eliminate possible intensity shifts between different LED's, that would occur if two LEDs were used.

The exemplary setup has the following properties

1. Stability versus pressure: Sapphire windows 9 can be used for their large resistance against pressure. As a pressure design criterion, a tensile strength of 400 MPa can be desirable. The windows 9 can be fixed to a stainless steel housing 10 by hard soldering. The pressurised chambers 5, 6 can be small enough such that the resulting pressure forces remain sufficiently small, as well. The chambers 5, 6 can be mainly filled with the filters 3, 4, and only a small oil volume for silicone oil 12 is left around the filters. As there are no membranes or other delicate parts, the exemplary setup needs no additional overpressure protection.

2. Total dimensions: The sensor can be designed as small as possible. This can minimize temperature gradients that can be important for the sensor performance. Furthermore, it may reduce the cost (especially for the detector system) and lead to smaller light losses, e.g. due to stray light. Here dimensions are chosen that allow easy production of the sensor.

3. Stability of light path: It can be important for the relative positions of LED 1, filters 3, 4 and detectors 7, 8 to be fixed relative to each other in space and to not change with temperature or other environmental conditions. This can be even more important in the differential pressure chamber configuration, because the symmetry of both light paths shall not be perturbed (see the symmetry axis 13 indicated in FIG. 3). The light path stability can be realized by attaching the LED 1 to a solid glass block 14 on top of the filter housing. There shall be maintained a distance between LED 1 and filters 3, 4 for geometric reasons (such as opening angle of the light cone 2 and dead zone in the middle of the sensor package). The LED 1 can be chosen to have a suitable angular light emission characteristic for this purpose.

In principle other exemplary arrangements of the parts or sensor elements can be used as well. For example, mirrors can be used, which can enhance the measurement effect and allows the sensor and detector to be placed on the same sides or faces of the filter housing. This can have the advantage that all electronic parts can be arranged on the side of the filter housing. Exemplary advantages of such different setups can be balanced against sensor complexity. For the current purpose, the exemplary setup shown in FIG. 3 can be used.

The filter 3, 4 can be a glass matrix with embedded semiconductor nanocrystals (Schott RG filter series). Such filters are available for arbitrary edge frequencies; here we have chosen a particular frequency in order to minimise errors caused by static pressure effects. Furthermore, filter and LED have been chosen to have similar shifts of the edge frequency and the peak position as a function of temperature, respectively. Alternatively to these filters, bulk semiconductor materials can be used. Pressure and temperature sensitivities of the different materials are similar and no significant performance advantage is expected. An alternative are photonic crystals with tailor made properties, such as appropriate spectral shift of absorption edge as a function of (differential) pressure and little or compensatable erroneous spectral shifts as a function of perturbations, such as absolute pressure variations and/or temperature.

A specification of optical and electronic components is given in Table 1.

TABLE 1

| LED | Osram Semiconductors, LA E655 | |
| --- | --- | --- |
| | peak wavelength | 624 nm |
| | peak width | 7.64 nm |
| | temperature coefficient | 0.15 nm/K |
| | power consumption | 1 mA |
| | price (estimation) | <0.5 EUR |
| Filter | Schott color glass filter: RG630 series | |
| | edge position (50% transmission) | 625.1 nm |
| | width (optimistic estimate) | 7.84 nm |
| | temperature coefficient | 0.14 nm/K |
| | pressure coefficient | −0.0024 nm/bar |
| | thickness | 1.8 mm |
| | approximate price | <0.07 EUR/mm$^2$ |
| Detection | Photodiode: Hamamatsu S6865-02, Amplifier: BurrBrown OPA1 24 | |
| | total estimated signal-to-noise ratio (SNR) | $1.2\,10^5$ |
| | power consumption | 1.5 mW |
| | total price of detection unit | <10 EUR |

Figure 7:
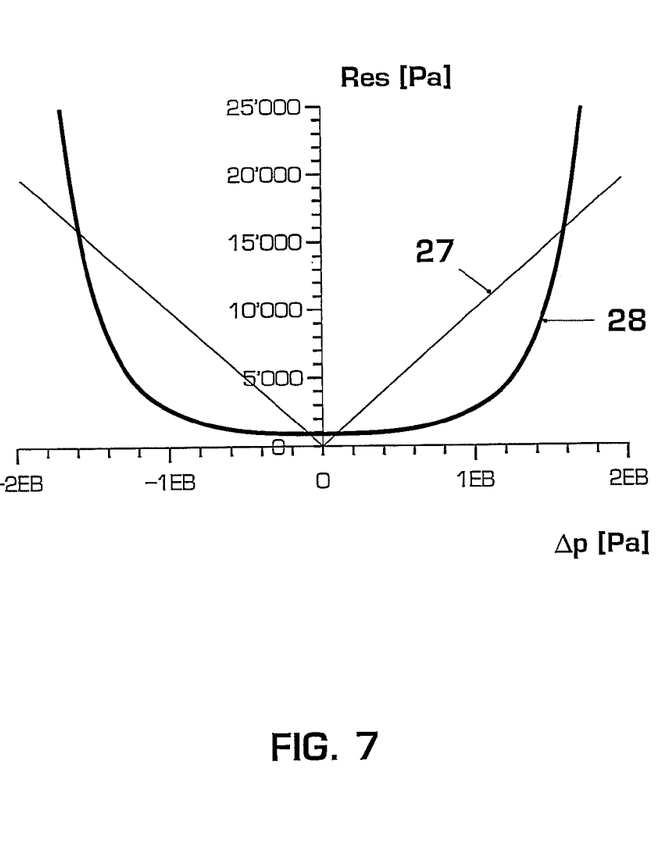
FIG. 7 shows an exemplary pressure resolution Res (in Pascal) as a function of differential pressure (in Pascal) for reference conditions.

A detector signal to noise ratio of $10^{-6}$ (optimistic estimate) is assumed. The pressure resolution, called Res (in Pascal) in FIG. 7, is given by the average signal noise divided by the pressure sensitivity or differential pressure sensitivity (i.e. the change of signal with differential pressure). This resolution can be compared with desired resolution that is $10^{-5}$ times the upper limit of the differential pressure. In the analysis, one finds that this can be fulfilled in the proposed setup for a pressure range between 817 bar and 15700 bar. The technology described here is hence particularly suitable for the measurement of large pressures; it can also be used for measuring pressure in the order of bars, if less stringent accuracy is admissible. In the following, a sensor with upper pressure limit of 900 bar is assumed for estimating signal errors due to temperature, static pressure, and so forth. In this pressure range the sensor signal is an almost exactly linear function of (differential) pressure. Deviations from linearity are below 0.32% of the signal and can easily be corrected, if desired.

Errors: As explained above, an exemplary setup as disclosed herein can have the zero-point error of the differential pressure, which is caused by temperature and static pressure variations, eliminated by the sensor construction. Thus, only the sensitivity of the signal depends on these quantities. Therefore, static pressure and temperature can lead to errors that are proportional to the measured value; they can be given as a percentage of the measured value. Temperature gradients or temperature differences between the two filters can be more important: they can lead to signals that cannot be distinguished from a differential pressure signal; therefore, shifts of zero-point and sensitivity can occur in the differential pressure signal.

Average temperature changes affect the sensitivity of the sensor, because LED peak and filter edge have slightly different temperature coefficient (see Table 1). If the temperature is not compensated, the maximal error amounts to 0.5% of the measured value at a temperature of 85° C. A temperature hysteresis smaller than 0.03% can be desired. Static pressure similarly can lead to an error, as the filter edge is shifted relative to the LED peak. In this case, we find an error of about 0.8%, if the static pressure is equal to the upper differential pressure limit (900 bar). All errors have been calculated exactly, i.e., no linearizations in the error calculations have been made.

The errors can be reduced, if additional measurements and signal corrections are made. Measuring the temperature with an accuracy of 1 K can reduce the temperature error from 0.5% of the measured value to approximately 0.01% (hence fulfilling the requirement of 0.03%). Even more interesting is the simultaneous correction of temperature and static pressure error by measurement of the LED light intensity: if the light power incident on the two filters is known, the error due to a relative shift of filter and LED frequency can be effectively corrected: the change of the sum signal $I_1+I_2$ normalised to the light input is a measure of the frequency difference between filter absorption edge and LED. For the worst case (85° C. and 900 bar at the same time) one finds a linearised error that is smaller than the estimated resolution of the sensor.

A similar effect is obtained, if instead of a system with a single filter and detector field per pressure chamber, two filters and two detector fields with slightly different filter characteristics are used (i.e., different edge frequency, see also FIG. 8 discussed further below). The use of sum and differences of the signals then also allows to estimate the frequency shifts between filters and LED. Furthermore, a redundant measurement of the differential pressure (using a difference between two filters twice) can be used to enhance the pressure resolution of the sensor.

Temperature differences between both filters shall be rather small in order to be negligible. For the current sensor structure, temperature differences between the filters cause a signal of about 62 bar/K. This implies that the average temperature difference between the filters should be of the order of $10^{-3}$K in order to guarantee an error below 0.03% of the upper (differential) pressure limit as may be desired. Temperature differences are, however, often an order of magnitude larger. Consequently, the sensor package and/or the sensor design can be improved in order to minimise the temperature differences, and/or the temperature differences shall be measured and used for signal correction accordingly in these cases.

Changes in the light distribution of the LED have similar effects; they can be caused by thermal motion of the mechanical structure. A small tilt of 0.1° already leads to a signal error of 15 bar, corresponding to 1.6% of the measurement range. This implies that the fixation of the LED shall be rather stable. A solid glass block 14 between filter housing and LED allows to achieve the desired mechanical stability of the sensor.

A summary of exemplary estimated errors in the pressure signal is given in Table 2, wherein URL denotes the upper range limit of the differential pressure, i.e. in the present case 900 bar.

TABLE 2

Error estimates for proposed sensor setup

| Average temperature | |
|---|---|
| error at 85° C. without temperature compensation | 0.45% of |
| error at 85° C. with temperature compensation | 0.01% of |
| error due to broadening of spectral peaks | size |
| Static pressure | |
| error at 900 bar without compensation | 0.8% of |
| Average temperature and static pressure | |
| error with compensation using LED light intensity (worst | <0.01% of |
| Temperature difference between filters | |
| zero-point error per average temperature difference | 62.5 bar/K |
| Symmetry of LED light distribution | |
| error for LED tilt by 0.1° | 15 bar |

Detailed Analysis:

Design considerations: Firstly, ideas for exemplary alternative sensor designs are considered. Different types of set-ups and measurement possibilities are described.

(i) Direct measurement of spectral shift: The sensor concept can be based on spectral shift of absorption characteristics of semiconductor materials. Spectral shifts can be measured in principle in several ways. Using a spectrometer would be time consuming and quite expensive. Interferometric methods could involve a powerful light source, such as a laser or superluminescent LED.

(ii) Use of laser diodes or lasers as light source: The use of a monochromatic light source can increase the accuracy of the device. According to calculations, the accuracy depends on width of light source and the filter. Therefore, reducing the width of the light source has only a limited effect on the accuracy (maximally a factor of 2). On the other hand, monochromatic lasers can be expensive.

(iii) Diodes in pressure chamber: It is also possible to have two LEDs in the pressure chambers (using a single filter) instead of placing two filter glasses there. From the physical point of view, one may either measure a shift of the LED spectral peak with pressure or a shift of the filter edge; the result should be the same. As a strict symmetry between the two measuring spots is necessary, it seems more challenging to use two LEDs that might have slightly different characteristics (even if they are nominally equal). Furthermore, the connection of the LEDs to a power supply inside the pressure chambers can be more demanding.

(iv) Separation of pressure chambers: It would be possible to separate the two pressure chambers spatially and connect them via fibre optics to the light source and detector. However, temperature compensation would be desired: different temperatures in both pressure chambers leads to errors that are demanding to compensate. Furthermore, the long-term stability of connection between fibres and the exact splitting of the incoming light intensity into two light beams can involve high-precision optics.

(v) Filter glass as window: It is possible to fabricate the windows of the pressure chambers of the filter glass directly (instead of using the sapphire windows as in the proposed setup). The window is then subjected to a more complicated tension than under hydrostatic pressure; exact calculations of the tension state are desirable. It might be assumed that similarly to the behaviour in hydrostatic pressure a shift of the edge wavelength results from an application of pressure inside the pressure chamber. In an exemplary embodiment, a single window can be used, if a mirror coating reflects the light back from the inside. The stability of such a setup versus pressure can be more important: glass breaks under small tension of its surfaces. Therefore, 8 MPa is a reasonable limit for such a construction.

Compared to these alternative designs, the present exemplary embodiment of FIG. 2 described herein can have the exemplary advantage of greater simplicity and higher stability against temperature variations.

Description of exemplary embodiment: An exemplary experimental setup is shown in FIG. 2. Light 2 of an LED 1 is used for monitoring the spectral position of the filter edge by measuring the transmission through it. Two filters 3, 4 are placed in separate pressure chambers 5, 6 where they are exposed to pressure p1 and p2, respectively. The illumination can be completely symmetrical; i.e., the same amount (or approximately the same amount, e.g., ±10%) of light 2 can enter each filter 3, 4. The differential pressure is measured by taking the difference of the transmission signals at detector 7 and 8. In order to compensate for the error caused by temperature and static pressure, a reference signal, e.g. the LED intensity, can be obtained additionally. The detector for the reference signal is not shown in FIG. 2. The setup can be constructed as small as possible to keep the errors caused by temperature gradients at a minimum.

Sensor setup, Sensor package and geometry: A sketch in side view and top view of an exemplary setup is shown in FIG. 3 a) and b). Due to symmetry, only parts of the sensor package are drawn. Only the relative dimensions of the drawing are important. The sensor can also be scaled down to keep temperature gradient errors small.

As pointed out above, the sensor can include (e.g., consist of) two independent pressure chambers 5, 6, each of which contains a sensing filter slab 3, 4. Stability and stress considerations suggest that the pressure chamber 5, 6 is realized best by a metal housing with sapphire windows 9. The connection between sapphire 9 and metal 10 can be done by hard soldering. The pressure transducing liquid is silicone oil 12, which can enter the pressure chamber through a small borehole 12 at the side of the pressure chamber. From signal-to-noise considerations it is desirable to get as much light from the LED 1 onto the detector as possible. Therefore the angular radiation pattern of the LED, which is different for different types of diodes, its distance to the windows 9 and the detector area should be optimised in order to obtain a large signal. Furthermore, it is important to realize a defined fixed position of the LED 1 with respect to the pressure chambers 5, 6, since the signal is given the difference of the transmission of the left and right half of the radiation pattern of the LED, respectively. In the proposed package the LED spacer is a glass block 14 fixed on the pressure chamber housing 10. The LED 1 can be glued onto the glass body 14.

Light source: Here, a light-emitting diode (LED) is chosen to monitor the pressure-induced spectral shift of the absorption. Key parameters include: peak wavelength, spectral width, temperature coefficient, and angular emission pattern. The LED should be selected such that optimum spectral overlap with the filter is achieved and that the temperature coefficient is close to the one of the filter. An exemplary width of an LED spectrum is FWHM=15-40 nm The temperature coefficient of peak wavelength can be between: $0.10 < K_T < 0.14$ nm/K (Osram Semiconductors). Also a factor of three lower and higher values can be found for some LEDs reported in literature. Furthermore, depending on the geometrical design of the sensor the optimal angular radiation characteristic can be selected. Fitting to the dimensions of our setup we have chosen an LED with a full angle of 60° (Osram Semiconductors, LA E655).

Power consumption: To reduce the power consumption of the LED and to achieve optimum signal detection, the LED 1 can be modulated by an oscillator circuit. For further assessments an oscillation frequency of 10 kHz with a duty cycle of 1:10 (operation current: 10 mA at 3V) was used. This can lead to an average power of 3 mW. This allows the use of a two wire 4-20 mA power supply for the device.

Detection System: The different components of the detection unit contain different noise sources which can be described separately. The photodiode contributes shot noise (photo current and dark current), the feedback resistor Johnson (thermal) noise, and the amplifier contributes with its input current noise and input voltage noise.

In the following, the SNR of a concrete example is given, using the above realistic device parameters and considering the approximate geometrical layout of the sensor. With an assumed optical power at the photodiode of approximately 20 µW, corresponding to a photo current of $Ip_h=10$ µA, the total (optical) noise equivalent power is 5.1 pW Hz$^{-1/2}$. Measuring in a bandwidth of $\Delta f=1$ kHz, one gets a signal-to-noise ratio of SNR=1.2.10$^5$. It is worthwhile to distinguish two regimes: For low photocurrents the SNR is proportional to $I_{Ph}$, whereas for high photocurrents SNR$\sim I_{Ph}^{1/2}$.

Exemplary Sensor Models and Performance Estimates, Analytical Sensor Model:

Light source characteristics: It is reasonable to approximate the spectral distribution of the LED by a Gaussian distribution.

Semiconductor nanocrystal filter: Nanoparticle-glass composites can be used in various applications, e.g. in color filters. They can be composed of $CdS_{1-x}Se_x$ or CdTe particles of approximately 5 nm dimension which are embedded in a borosilicate matrix. As an example, color filters from Schott are made of such materials (GG-, OG-, RG-filters). The optical properties, such as position of the absorption edge, can be tailored by varying the volume fraction of the nanocrystal materials and the size of the nanocrystals. The size can be controlled by a simple heating treatment of the filter glass using temperatures between 800-1300 K. For calculations of the transmission through a nanocrystal-glass-composite the filter function is approximated using the error function erf(x).

Figure 4:
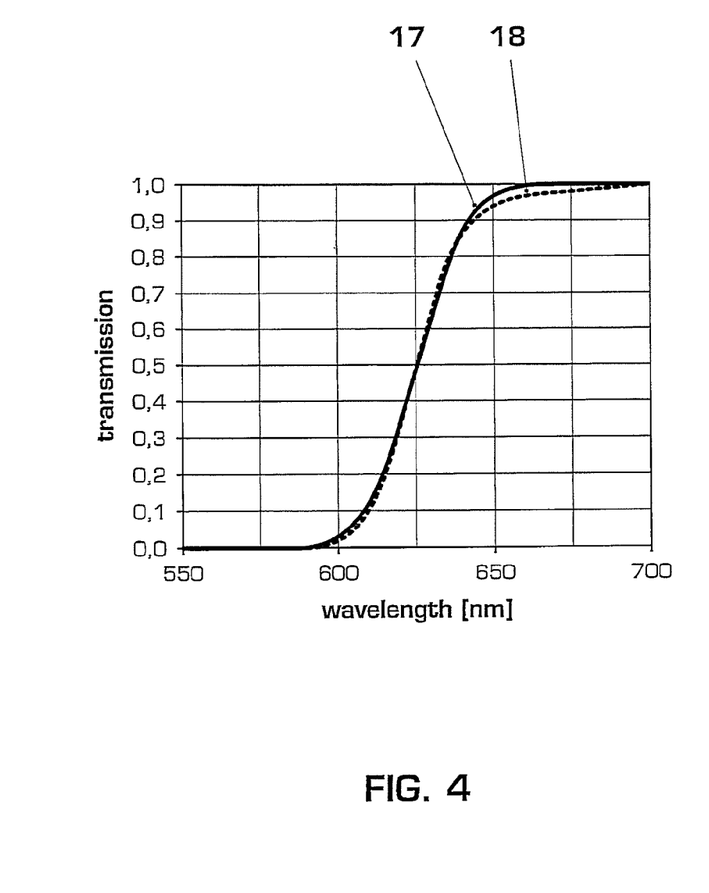
FIG. 4 shows an exemplary filter function fitted to characteristics of a nanocrystal-doped glass filter (RG 630, d=1.8 mm)
Figure 5:
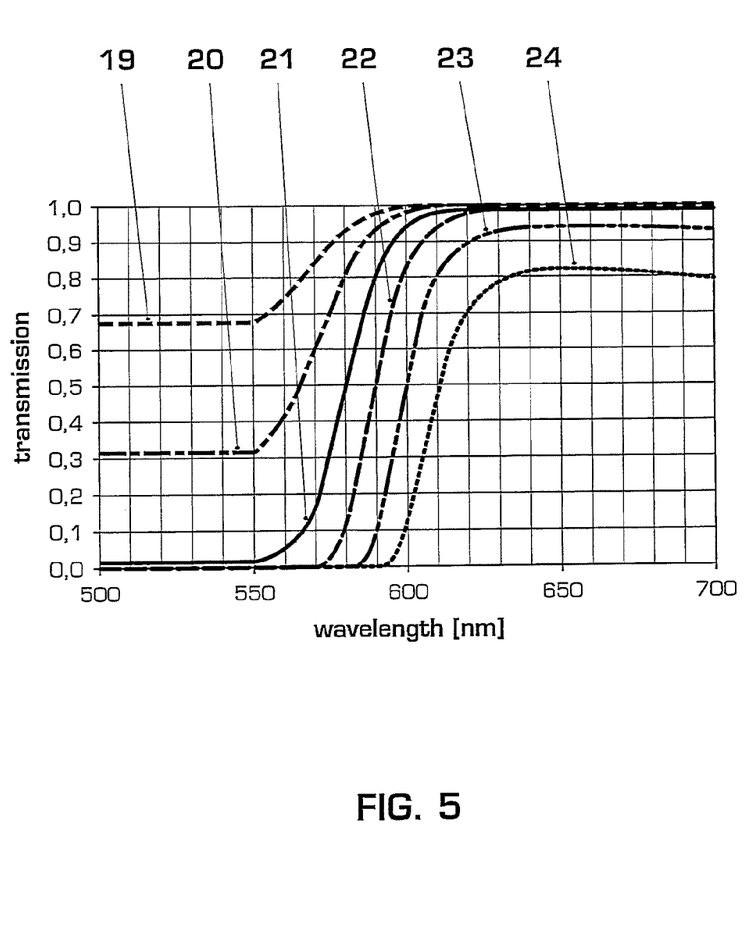
FIG. 5 shows an exemplary transmission of filter glass (Schott, OG590) for various thicknesses.

FIG. 4 shows the filter function $T(\lambda)$ fitted to the characteristics of a commercially available filter (Schott RG630, d=1.8 mm). The filter function is fitted to the characteristics of nanocrystal doped glass filter (RG630, d=1.8 mm), and the fit parameters are $\lambda_0=625.5$ nm, $\sigma_F=19.08$ nm). The error function 17 can be suitable as an approximation of the real filter function 18. The transmission of the filter can be also dependent on the filter thickness d. For perpendicular incidence and homogeneous absorption the law of Bouguer and Lambert determines the transmission (Schott glass filter definitions). FIG. 5 illustrates exemplary transmission curves for various thicknesses together with the fit.

Exemplary pressure range and sensitivity, Sensor signal and pressure sensitivity:

The exemplary setup described herein uses two pressure chambers 5, 6; two intensities $I_1$ and $I_2$ are measured in order to determine the differential pressure. It may seem that the setup includes mainly two independent absolute pressure measurements (one for each chamber) and that an absolute pressure sensor could be realized with a single pressurised sensor. This is not the case; even for such a sensor, a second chamber is used in the exemplary embodiment.

This can be seen as follows: the temperature dependence of the signal is large compared to the pressure dependence ($K_{T,F}(T_{max}-T_{ref}) > K_p \ P_{max}$, for $K_{T,F}=0.15$ nm/K, $T_{max}-T_{ref}=65$ K, $K_p=0.0024$ nm/bar, and $p_{max}=900$ bar, wherein $K_{T,F}$ is the temperature coefficient of the error function of the filter, and $K_p$ is the pressure coefficient of the error function of the filter). Using a single cell, temperature effects will shift the zero of the system, and it is difficult to compensate this shift. Hence a temperature compensation is used.

The use of two chambers allows to use not the individual intensities, but rather their difference (or ratio divided by sum) as the signal to be analysed. Using the equations for the intensities measured in the detectors and assuming that the temperatures in both filters are the same, it is easy to see that the difference $I_1 - I_2$ for differential pressure $\Delta p = 0$ indeed vanishes. Furthermore, the difference signal can be monotonous in $\Delta p$. For small differential pressures, a series expansion in the differential pressure may be made; to first order, one obtains $$I_1 - I_2 \approx \exp\left(\frac{\lambda_T - K_p \Sigma_p}{\sigma_L^2 + \sigma_F^2}\right) \frac{K_p}{\sqrt{\pi(\sigma_L^2 + \sigma_F^2)}} \cdot \Delta p = S(T, \Sigma_p) \cdot \Delta p,$$

wherein $$\lambda_T = \lambda_0(T_{ref}) - \overline{\lambda_0}(p_{ref}, T_{ref}) + (K_{T1,L} - K_{T,F})(T - T_{ref})$$

wherein $\lambda_T$=difference wavelength of LED peak wavelength and filter absorption edge wavelength (at reference pressure) as a linearized function of sensor temperature, $K_p$=pressure coefficient of error function of filter, $\Sigma_p$=static pressure, $\sigma_L^2$=variance of Gaussian LED spectrum, $\sigma_F^2$=width of error function erf (=variance of first derivative of error function describing filter spectral absorption), S=sensor sensitivity to differential pressure, $\lambda_0$=peak wavelength position of LED spectrum, $T_{ref}$=reference sensor temperature, $p_{ref}$=reference pressure, $\overline{\lambda_0}$ (dashed)=absorption edge wavelength of filter, $K_{T1,L}$=temperature coefficient of LED peak wavelength, $K_{T,F}$=temperature coefficient of absorption edge (absorption edge being defined by 50% transmission value of error function) of filter, T=sensor temperature (assumed to be identical for LED and filter).

Here the sensitivity S is defined with respect to differential pressure. Using the specifications from above, exemplary sensitivies are 1.2 $10^{-4}$/bar. Note that the sensitivity depends on temperature and static pressure; the zero of the signal does not depend on these quantities (as desired).

The quantity $(I_1-I_2)/(I_1+I_2)$ can alternatively be used as a signal; a similar equation defining the sensitivity to differential pressure can be derived for this case, as well.

Figure 6:
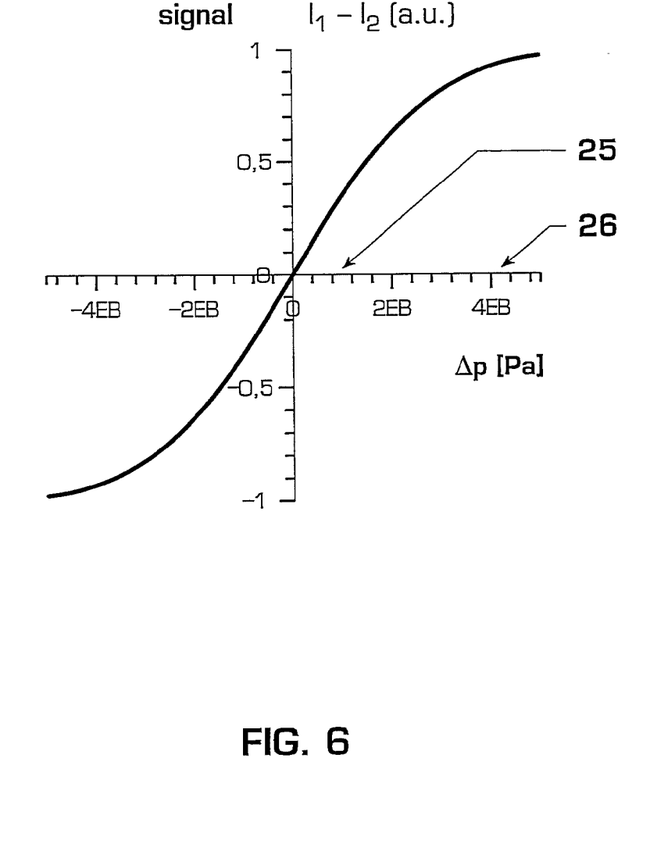
FIG. 6 shows a known curve for a (normalized) signal $I_1-I_2$ as a function of differential pressure $\Delta p$ (in Pascal), indicating possible measurement ranges.

The signal $(I_1-I_2)$ as a function of $\Delta p$ is plotted at reference conditions for an exemplary case in FIG. 6. As can be seen the signal is rather linear for various ranges of the pressure measurement. For very large pressures (outside of the desired ranges) the nonlinearity of the signal becomes clearly visible; in this case the linear approximation is no longer valid. However, as the signal dependence on differential pressure is known, the correction of the nonlinearity poses in principle no problem.

Determination of the Pressure Ranges:

For an assessment of certain high sensitivity applications, the desired resolution of the differential pressure can be assumed to be approximately $10^{-5}$ at reference conditions (v-like curve 27 in FIG. 7). We assume that filter and LED are, for example, ideally adjusted. The pressure resolution of the sensor at a given signal can be determined by the signal-to-noise ratio of the detector and the steepness of the signal curve (sensitivity) as a function of pressure: In linear approximation the pressure resolution Res or $\Delta p_{res}$ at a given differential pressure $\Delta p$ is given by the inverse of the sensitivity s multiplied with the signal to noise ratio of the detection setup. In FIG. 7, the pressure resolution Res or $\Delta p_{res}$ (in Pascal) is plotted as a function of differential pressure $\Delta p$ (in Pascal) by the u-shaped (quasi-parabolic) curve 28.

The pressure range for the sensor in this high sensitivity case can be chosen so that a desired relative resolution of, for example, $10^{-5}$ is fulfilled. To find the pressure range, the additional curve 27 in FIG. 7 is shown which represents the goal of relative resolution of $10^{-5}$. The pressure range (i.e. the range of admissible upper pressure limits) meeting this specification should fulfil two conditions: (i) for the upper pressure limit, the resolution has to be smaller than $10^{-5}$, i.e. the curve 28 has to lie below the curve 27; this means that the upper pressure limit can be chosen between the two intersection points of curves 27 and 28, i.e. between 817 bar and 15700 bar; (ii) for all pressures smaller than this limit, the resolution may not exceed $10^{-5}$ times the upper pressure limit. This second condition is automatically fulfilled, because the pressure resolution Res given in Pascal values automatically decreases with descreasing differential pressures $\Delta p$. In the present case, the upper pressure limit can be chosen between 817 bar and 15700 bar.

Figure 8:
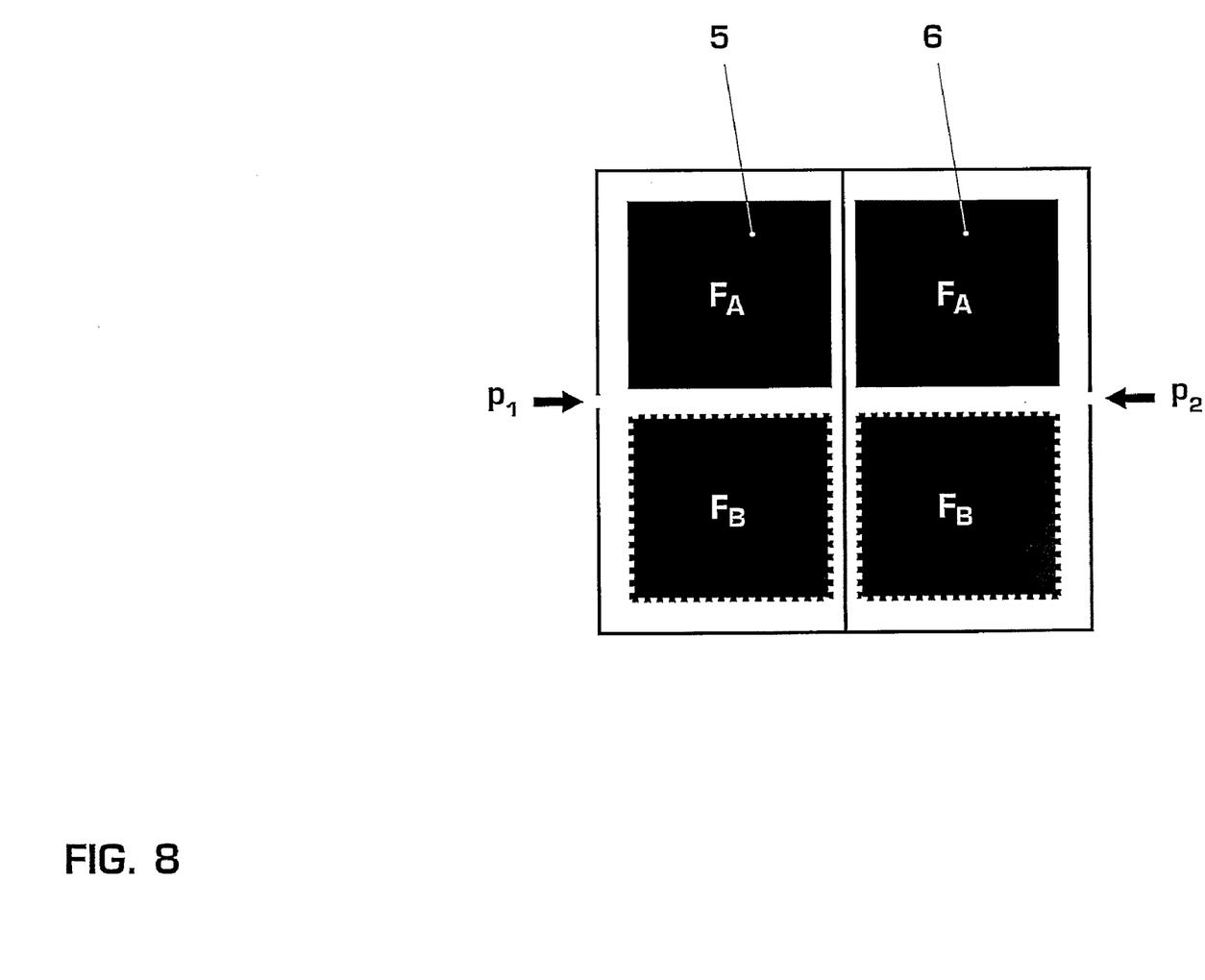
FIG. 8 shows an exemplary setup of a semiconductor differential pressure sensor according to an embodiment of the disclosure with two pressure chambers in each of which two different pressure sensing elements $F_A$, $F_B$ are present.

Compensation Using a Split Filter System:

Instead of the direct measurement of the LED intensity, the use of a system with four filters is also possible: each of the two chambers 5, 6 contains two different filters $F_A$ and $F_B$, respectively, as is shown in FIG. 8. A four quadrant detector measures four different intensities ($I_1$ and $I_3$ for chamber 5, $I_2$ and $I_4$ for chamber 6). Filters A and B are characterised by a different edge wavelength or absorption edge.

This configuration allows on one hand to have two independent measurements of signal differences and hence differential pressure. This increases the resolution and allows the use of the sensor for smaller differential pressure ranges. On the other hand, e.g. the quantity $(I_1+I_2)/(I_3+I_4)$ can be used to characterise temperature and static pressure changes in a similar way as the intensity measurement discussed above. As a single (split) detector diode is used, the additional cost can be less than for the exemplary setup already discussed. A calculation similar to the calculation in the section above can lead to a maximal relative error estimate of 0.0035% for the differential pressure, wherein further the error is an almost linear function of the wavelength shift.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 light source, LED
2 light beam
3 first filter
4 second filter
5 first pressure chamber
6 second pressure chamber
7 first detector
8 second detector
9 Sapphire plates
10 frame elements
11 ridge of 10
12 pressure opening filled with silicone oil 13 symmetry plane
14 glass block
15 high-frequency shift or blue shift of filter
16 pressure sensor
17 fit curve
18 measured curve of RG 630, d=1.8 mm
19-24 measured curves for thicknesses of 0.1, 0.3, 1, 3, 10, 30 mm, respectively
25 typical measurement range
26 maximum measurement range
27 target value of the differential pressure resolution
28 pressure resolution calculated
30 cavity of the pressure chamber
p1 pressure acting on first pressure chamber
p2 pressure acting on second pressure chamber
L spectrum of light source
F filter curve
$F_A$, $F_B$ filter types A, B with different absorption edges
Tr transmission curve
$I_1$, $I_2$ intensity measured in first, second detector
$\theta_1$, $\theta_2$ boundary angles of light emission characteristics, light cone boundary angles
W, d, l filter width, thickness, length
h thickness of pressure chambers

What is claimed is:

1. A pressure sensor, comprising:
   at least two pressure sensing elements positioned in individual pressure chambers, which pressure sensing elements are arranged in close enough proximity to each other for irradiation by a common light source such that light transmitted through the pressure sensing elements will depend on pressure;
   at least two detectors, wherein differential pressure in the individual pressure chambers is evaluated by the pressure sensor based on outputs of the at least two detectors; and
   a light source for providing the irradiation, wherein the at least two pressure sensing elements are arranged either:
   in a single plane; or
   under an angle of tilt towards each other of less than 180° and more than or equal to 90°, wherein the angle of tilt is adapted to light emission characteristics of the light source.

2. The pressure sensor according to claim 1, wherein the light source is arranged on one side of the at least two pressure sensing elements for irradiating the pressure sensing elements under comparable optical conditions.

3. Pressure sensor according to claim 2, comprising:
   a symmetry plane for establishing two half spaces, the light source being positioned essentially in the symmetry plane and the pressure sensing elements being positioned in mutually symmetrical positions in either of the half spaces.

4. Pressure sensor according to claim 2, comprising:
   an optically essentially transparent block between the pressure sensing elements and the light source through which illumination passes from the light source to the pressure sensing elements, wherein the light source is fastened to or integrated in said block, and wherein the pressure sensing elements and/or the pressure chambers are fastened to or integrated in said block.

5. The pressure sensor according to claim 1, wherein each pressure chamber comprises:
   at least one frame element holding at least two optically essentially transparent distanced windows, one facing the light source and the other one facing the detector, wherein an interspace between the at least two windows forms a cavity of the pressure chamber, which except from a pressure sensing opening is shielded from the surrounding pressure, and wherein the at least two pressure sensing elements are semiconductor-based pressure sensing elements arranged inside the cavity.

6. The pressure sensor according to claim 5, wherein the windows are sapphire windows, and wherein the individual pressure chambers are arranged in the same plane.

7. Pressure sensor according to claim 1, wherein the pressure sensing elements are filter elements with an absorption edge which is spectrally shifted under influence of an external pressure.

8. Pressure sensor according to claim 1, wherein the pressure sensing elements are a glass matrix comprising embedded semiconductor nano-crystals.

9. The pressure sensor according to claim 2, comprising:
   an intensity detector for measurement of intensity of the light source without attenuation through the pressure sensing elements, and/or a temperature sensing detector, an output of at least one of these detectors being taken into account for compensating spectral shifts in outputs of the detectors that would disturb the differential pressure measurement.

10. Pressure sensor according to claim 2, comprising:
    at least two pairs of pressure sensing elements for irradiation by said light source.

11. Pressure sensor according to claim 10, wherein the at least two pairs of pressure sensing elements have a different filter absorption edge, and at least two different pressure sensing elements are provided in a same pressure chamber.

12. Pressure sensor according to claim 1, wherein the detectors measure total integrated intensity within a certain spectral range.

13. Pressure sensor according to claim 2, wherein the light source has a spectral width of the order of a width of an absorption edge of the pressure sensing element or smaller.

14. The pressure sensor according to claim 1, wherein a signal evaluated for the pressure measurement is a difference of signals from the at least two detectors, the difference divided by a sum of the signals, or another ratio corrected by further signals.

15. Pressure sensor according to claim 2, comprising:
    at least one mirror for reflecting light to propagate at least twice through the pressure sensing elements, with the light source and the detectors being positioned on the same sides of the pressure sensing elements.

16. Pressure sensor according to claim 1, wherein the pressure sensing elements are joined to or are an integral part of a window element of the pressure chambers.

17. Pressure sensor according to claim 2, wherein the light source is a light emitting diode.

18. Pressure sensor according to claim 2, wherein the light source is a monochromatic light source having at least one of a fixed frequency and an adjustable frequency for spectral analysis of an absorption edge of the pressure sensing elements.

19. A method for detecting a pressure using a pressure sensor, comprising:
    arranging at least two semiconductor-based or photonic-crystal-based pressure sensing elements in individual pressure chambers for irradiation by one light source;
    illuminating the at least two pressure sensor elements with the one light source;
    detecting light transmitted through the pressure sensing elements using at least two detectors; and
    evaluating pressure induced changes in optical properties of the pressure sensing elements using a differential pressure in the individual pressure chambers based on at least one of a differential output of the detectors, a sum output of the detectors, and a ratio of the outputs of detectors, wherein the at least two pressure sensing elements are arranged either:

in a single plane; or under an angle of tilt towards each other of less than 180° and more than or equal to 90°, wherein the angle of tilt is adapted to light emission characteristics of the one light source.

20. The pressure sensor according to claim 1, wherein pressure differences above 500 bar up to 20000 bar are measured.

21. The pressure sensor according to claim 1, wherein the light source is arranged on one side of the pressure sensing elements and irradiates the at least two pressure sensing elements under comparable optical conditions.

22. Pressure sensor according to claim 5, comprising:

oil in the cavity.

23. Pressure sensor according to claim 1, wherein the pressure sensing elements are made from borosilicate glass comprising embedded semiconductor nano-crystals.

24. Pressure sensor according to claim 1, wherein the pressure sensing elements are bulk semiconductor crystal.

25. Pressure sensor according to claim 1, wherein the pressure sensing elements are based on a photonic crystal.

26. Pressure sensor according to claim 1, wherein the detectors are detector diodes.

27. A pressure sensor, comprising:

at least two pressure sensing elements positioned in individual pressure chambers, which pressure sensing elements are arranged close enough to each other for irradiation by a common light source such that light transmitted through the pressure sensing elements will depend on pressure;

at least two detectors, wherein differential pressure in the individual pressure chambers is evaluated by the pressure sensor based on outputs of the at least two detectors; and an optically essentially transparent block between the pressure sensing elements and the light source through which illumination passes from the light source to the pressure sensing elements, wherein the light source is fastened to or integrated in said block, and wherein the pressure sensing elements and/or the pressure chambers are fastened to or integrated in said block, and wherein the at least two pressure sensing elements are arranged either:

in a single plane; or under an angle of tilt towards each other of less than 180° and more than or equal to 90°, wherein the angle of tilt is adapted to light emission characteristics of the light source.

28. A pressure sensor, comprising:

at least two pressure sensing elements positioned in individual pressure chambers, which pressure sensing elements are arranged sufficiently close enough to each other for irradiation by a common light source such that light transmitted through the at least two pressure sensing elements will depend on pressure;

at least two detectors, wherein differential pressure in the individual pressure chambers is evaluated by the pressure sensor based on outputs of the at least two detectors; and at least two pairs of pressure sensing elements for irradiation by said light source, wherein the at least two pairs of pressure sensing elements have a different filter absorption edge, and at least two different pressure sensing elements are provided in a same pressure chamber, wherein the at least two pressure sensing elements are arranged either:

in a single plane; or under an angle of tilt towards each other of less than 180° and more than or equal to 90°, wherein the angle of tilt is adapted to light emission characteristics of the common light source.

29. A pressure sensor, comprising:

at least two pressure sensing elements positioned in individual pressure chambers, which pressure sensing elements are arranged at least close enough to each other for irradiation by a common light source such that light transmitted through the pressure sensing elements will depend on pressure;

at least two detectors, wherein differential pressure in the individual pressure chambers is evaluated by the pressure sensor based on outputs of the at least two detectors; and a light source for providing the irradiation, wherein the at least two pressure sensing elements are arranged either:

in a single plane; or under an angle of tilt towards each other of less than 180° and more than or equal to 90°, wherein the angle of tilt is adapted to light emission characteristics of the light source, and wherein the light source:

is arranged on one side of the pressure sensing elements for irradiating the pressure sensing elements under comparable optical conditions, and has a spectral width of the order of a width of an absorption edge of the pressure sensing element.

30. A pressure sensor, comprising:

at least two pressure sensing elements positioned in individual pressure chambers, which pressure sensing elements are arranged at least close enough to each other for irradiation by a common light source such that light transmitted through the pressure sensing elements will depend on pressure;

at least two detectors, wherein differential pressure in the individual pressure chambers is evaluated by the pressure sensor based on outputs of the at least two detectors; and a light source for providing the irradiation, wherein the at least two pressure sensing elements are arranged either:

in a single plane; or under an angle of tilt towards each other of less than 180° and more than or equal to 90°, wherein the angle of tilt is adapted to light emission characteristics of the light source, and wherein the light source is:

arranged on one side of the pressure sensing elements for irradiating the pressure sensing elements under comparable optical conditions, and a monochromatic light source having at least an adjustable frequency for spectral analysis of an absorption edge of the pressure sensing elements.

* * * * *